(12) United States Patent
Talathi

(10) Patent No.: US 10,510,146 B2
(45) Date of Patent: Dec. 17, 2019

(54) NEURAL NETWORK FOR IMAGE PROCESSING

(71) Applicant: QUALCOMM Incorporated, San Diego, CA (US)

(72) Inventor: Sachin Subhash Talathi, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 379 days.

(21) Appl. No.: 15/422,395

(22) Filed: Feb. 1, 2017

(65) Prior Publication Data

US 2018/0101957 A1    Apr. 12, 2018

Related U.S. Application Data

(60) Provisional application No. 62/405,192, filed on Oct. 6, 2016.

(51) Int. Cl.
*G06K 9/00* (2006.01)
*G06T 7/10* (2017.01)
(Continued)

(52) U.S. Cl.
CPC .......... *G06T 7/10* (2017.01); *G06K 9/46* (2013.01); *G06T 3/4053* (2013.01); *G06T 5/002* (2013.01);
(Continued)

(58) Field of Classification Search
CPC ............ G06K 9/46; G06T 2207/10024; G06T 2207/20081; G06T 2207/20084;
(Continued)

(56) References Cited

U.S. PATENT DOCUMENTS 6,819,790 B2    11/2004    Suzuki et al.
9,396,523 B2     7/2016    Jancsary et al.
(Continued)

FOREIGN PATENT DOCUMENTS

GB    2398976 A    9/2004

OTHER PUBLICATIONS

Badrinarayanan, Vijay, Alex Kendall, and Roberto Cipolla. "SegNet: A Deep Convolutional Encoder-Decoder Architecture for Image Segmentation." arXiv:1511.00561. (Year: 2016).*
(Continued)

*Primary Examiner* — Nirav G Patel
(74) *Attorney, Agent, or Firm* — Seyfarth Shae LLP

(57) ABSTRACT

A method for processing an input in an artificial neural network (ANN) includes receiving, at an operator layer of a set of operator layers, a first feature value based on the input from a decoder convolutional layer of a decoder. The operator layer also receives a second feature value based on the input from an encoder convolutional layer of a encoder. The method also includes determining, at the operator layer, a third feature value based on the input by performing an element-wise operation with the first feature value based on the input and the second feature value based on the input. The method transmits, from the operator layer, the third feature value based on the input to an encoder layer that is subsequent to the encoder convolutional layer. The method generates an output based on the third feature value based on the input.

20 Claims, 16 Drawing Sheets

(51) Int. Cl.
*G06K 9/46* (2006.01)
*G06T 3/40* (2006.01)
*G06T 5/00* (2006.01)
*G06T 9/00* (2006.01)

(52) U.S. Cl.
CPC ............... *G06T 5/003* (2013.01); *G06T 9/00* (2013.01); *G06T 2207/10024* (2013.01); *G06T 2207/20081* (2013.01); *G06T 2207/20084* (2013.01)

(58) Field of Classification Search
CPC ....... G06T 3/4053; G06T 5/002; G06T 5/003; G06T 7/10; G06T 9/00
See application file for complete search history.

(56) References Cited

U.S. PATENT DOCUMENTS 9,430,817 B2   8/2016  Schelten et al.
2019/0197642 A1*  6/2019  Rodriguez ......... G06K 9/00442

OTHER PUBLICATIONS

Egmont-Petersen M., et al., "Image Processing with Neural Networks—A Review", Pattern Recognition, Oct. 2002, vol. 35, No. 10, pp. 2279-2301.
Noh H., et al., "Learning Deconvolution Network for Semantic Segmentation", IEEE International Conference on Computer Vision, May 2015, pp. 1520-1528.
Badrinarayanan V., et al., "SegNet: A Deep Convolutional Encoder-Decoder Architecture for Image Segmentation," arXiv:1511.00561v3 [cs.CV], Oct. 10, 2016, pp. 1-14.
Ghodrati A., et al., "Towards Automatic Image Editing: Learning to See another You", Cornell Universitz Library/Computer Vision and Pattern Recognition, Nov. 26, 2015, XP002775761, Retrieved from the Internet: URL: https://arxiv.org/abs/1511.08446 [retrieved on Nov. 20, 2017], 9 pages.
International Search Report and Written Opinion—PCT/US2017/050237—ISA/EPO—dated Nov. 28, 2017.
Ji X., et al., "Image Super-Resolution with Deep Convolutional Neural Network", 2016 IEEE First International Conference on Data Science in Cyberspace (DSC), Jun. 13, 2016, pp. 626-630, XP033072357, DOI: 10.1109/DSC.2016.1 04 [retrieved on Feb. 27, 2017].

* cited by examiner

NEURAL NETWORK FOR IMAGE PROCESSING

CROSS-REFERENCE TO RELATED APPLICATION

The present application claims the benefit of U.S. Provisional Patent Application No. 62/405,192, filed on Oct. 6, 2016 and titled "NEURAL NETWORK FOR IMAGE PROCESSING," the disclosure of which is expressly incorporated by reference herein in its entirety.

BACKGROUND

Field

Certain aspects of the present disclosure generally relate to machine vision and, more particularly, to improving image processing, such as semantic segmentation, image de-noising, image de-blur, and/or super-resolution, using machine vision systems and methods.

Background

An artificial neural network, which may comprise an interconnected group of artificial neurons (e.g., neuron models), is a computational device or represents a method to be performed by a computational device.

Deep convolutional networks (DCNs) may be used for classifying images. DCNs may also be used for non-classification tasks. For example, a DCN may be specified to process images obtained via, for example, a machine vision system. The image processing may include semantic segmentation, image de-noising, image de-blur, and/or super-resolution.

Image de-blur refers to modifying blurred image to be in focus. Super-resolution refers to improving or restoring the resolution of an input image. Semantic segmentation refers to assigning a value to each classified pixel of an image (e.g., classification at every pixel). For example, if an image of a beach is used as an input image, the pixels associated with sand will be labeled sand, pixels associated with the water will be labeled water, etc. The labels may be used to generate a mask to determine areas of sand, water, and/or sky in the image. Image de-noising refers to removing the noise of an input image, such that an output image is a high contrast image.

Neural networks designed for image processing may comprise two or more stages, such as an encoder and a decoder. During encoding, input image pixels are mapped to low dimensional feature representations. Additionally, the decoder maps the low dimensional feature representations, received from the encoder, to a full resolution image. The full resolution image may be a semantic segmentation representation, a de-noised image, a de-blurred image, or a super-resolution image. In one example, the resolution of an output image should be better than the resolution of the input image.

A network with the aforementioned structure (e.g., encoder/decoder stage) may be referred to as a convolutional encoder-decoder (CED) network.

SUMMARY

In one aspect of the present disclosure, a method for processing an input in an artificial neural network (ANN) is disclosed. The method includes receiving, at a first operator layer of a first set of operator layers, a first feature value based on the input from a first decoder convolutional layer of a first decoder and a second feature value based on the input from an encoder convolutional layer of a first encoder. The method also includes determining, at the first operator layer, a third feature value based on the input by performing an element-wise operation with the first feature value based on the input and the second feature value based on the input. The method further includes transmitting, from the first operator layer, the third feature value based on the input to an encoder layer that is subsequent to the encoder convolutional layer. The method still further includes generating an output of the ANN based on the third feature value based on the input.

Another aspect of the present disclosure is directed to an apparatus including means for receiving, at a first operator layer of a first set of operator layers, a first feature value based on the input from a first decoder convolutional layer of a first decoder and a second feature value based on the input from an encoder convolutional layer of a first encoder. The apparatus also includes means for determining, at the first operator layer, a third feature value based on the input by performing an element-wise operation with the first feature value based on the input and the second feature value based on the input. The apparatus further includes means for transmitting, from the first operator layer, the third feature value based on the input to an encoder layer that is subsequent to the encoder convolutional layer. The apparatus still further includes means for generating an output of the ANN based on the third feature value based on the input.

In another aspect of the present disclosure, a non-transitory computer-readable medium with non-transitory program code recorded thereon is disclosed. The program code for processing an input in an ANN is executed by a processor and includes program code to receive, at a first operator layer of a first set of operator layers, a first feature value based on the input from a first decoder convolutional layer of a first decoder and a second feature value based on the input from an encoder convolutional layer of a first encoder. The program code also includes program code to determine, at the first operator layer, a third feature value based on the input by performing an element-wise operation with the first feature value based on the input and the second feature value based on the input. The program code further includes program code to transmit, from the first operator layer, the third feature value based on the input to an encoder layer that is subsequent to the encoder convolutional layer. The program code still further includes program code to generate an output of the ANN based on the third feature value based on the input.

Another aspect of the present disclosure is directed to an ANN for processing an input, the ANN having a memory unit and one or more processors coupled to the memory unit. The processor(s) is configured to receive, at a first operator layer of a first set of operator layers, a first feature value based on the input from a first decoder convolutional layer of a first decoder and a second feature value based on the input from an encoder convolutional layer of a first encoder. The processor(s) is also configured to determine, at the first operator layer, a third feature value based on the input by performing an element-wise operation with the first feature value based on the input and the second feature value based on the input. The processor(s) is further configured to transmit, from the first operator layer, the third feature value based on the input to an encoder layer that is subsequent to the encoder convolutional layer. The processor(s) is still further configured to generate an output of the ANN based on the third feature value based on the input.

In one aspect of the present disclosure, a method of processing an input in an artificial neural network (ANN) is disclosed. The method includes receiving, at a first operator layer of a set of operator layers, a first feature value based on the input from a first decoder convolutional layer of a decoder and a second feature value based on the input from a first encoder convolutional layer of a encoder. The method also includes determining, at the first operator layer, a third feature value based on the input by performing a multiplication operation with the first feature value based on the input and the second feature value based on the input. The method further includes transmitting, from the first operator layer, the third feature value based on the input to a decoder layer that is subsequent to the first decoder convolutional layer. The method still further includes generating an output of the ANN based on the third feature value based on the input.

Another aspect of the present disclosure is directed to an apparatus including means for receiving, at a first operator layer of a set of operator layers, a first feature value based on the input from a first decoder convolutional layer of a decoder and a second feature value based on the input from a first encoder convolutional layer of a encoder. The apparatus also includes means for determining, at the first operator layer, a third feature value based on the input by performing a multiplication operation with the first feature value based on the input and the second feature value based on the input. The apparatus further includes means for transmitting, from the first operator layer, the third feature value based on the input to a decoder layer that is subsequent to the first decoder convolutional layer. The apparatus still further includes means for generating an output of the ANN based on the third feature value based on the input.

In another aspect of the present disclosure, a non-transitory computer-readable medium with non-transitory program code recorded thereon is disclosed. The program code for processing an input in an ANN is executed by a processor and includes program code to receive, at a first operator layer of a set of operator layers, a first feature value based on the input from a first decoder convolutional layer of a decoder and a second feature value based on the input from a first encoder convolutional layer of a encoder. The program code also includes program code to determine, at the first operator layer, a third feature value based on the input by performing a multiplication operation with the first feature value based on the input and the second feature value based on the input. The program code further includes program code to transmit, from the first operator layer, the third feature value based on the input to a decoder layer that is subsequent to the first decoder convolutional layer. The program code still further includes program code to generate an output of the ANN based on the third feature value based on the input.

Another aspect of the present disclosure is directed to an ANN for processing an input, the ANN having a memory unit and one or more processors coupled to the memory unit. The processor(s) is configured to receive, at a first operator layer of a set of operator layers, a first feature value based on the input from a first decoder convolutional layer of a decoder and a second feature value based on the input from a first encoder convolutional layer of a encoder. The processor(s) is also configured to determine, at the first operator layer, a third feature value based on the input by performing a multiplication operation with the first feature value based on the input and the second feature value based on the input.

The processor(s) is further configured to transmit, from the first operator layer, the third feature value based on the input to a decoder layer that is subsequent to the first decoder convolutional layer. The processor(s) is still further configured to generate an output of the ANN based on the third feature value based on the input.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
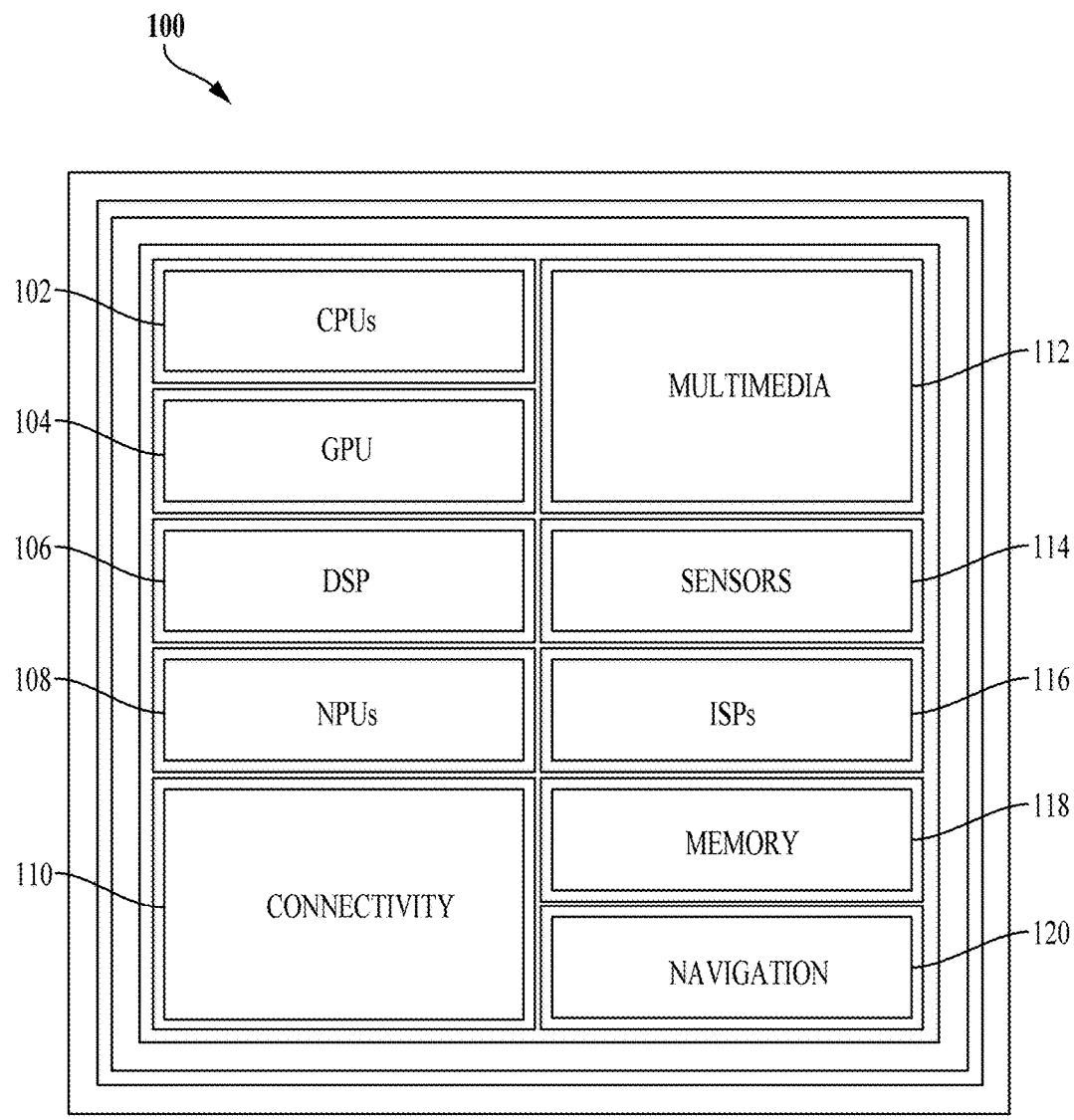
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As previously discussed, neural networks designed for image processing, such as semantic segmentation, image de-noising, image de-blur, and/or super-resolution, may comprise two or more stages, such as an encoder and a decoder.

Aspects of the present disclosure are directed to improving the encoding by providing a feedback connection from a decoder. Furthermore, aspects of the present disclosure are directed to improving the decoding by providing a feed-forward connection from the encoder. In one configuration, a hybrid convolutional encoder-decoder (CED) and feed-forward skip connection CED (fCED) network is implemented to improve the decoding and encoding of an input, such as an image, for image processing.

FIG. 1 illustrates an example implementation of the aforementioned action localization using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 (e.g., at least one processor) may be loaded from a program memory associated with the CPU 102 or may be loaded from a dedicated memory block 118.

The SOC may be based on an ARM instruction set. In an aspect of the present disclosure, the instructions loaded into the general-purpose processor 102 may comprise code for processing an input, such as a frame from a sequence of frames, of an artificial neural network (ANN). The instructions loaded into the general-purpose processor 102 may comprise code to receive, at a first operator layer of a first set of operator layers, a first feature value based on the input from a first decoder convolutional layer of a first decoder and a second feature value based on the input from an encoder convolutional layer of a first encoder. In addition, the instructions loaded into the general-purpose processor 102 may comprise code to determine, at the first operator layer, a third feature value based on the input by performing an element-wise operation with the first feature value and the second feature value based on the input. Furthermore, the instructions loaded into the general-purpose processor 102 may comprise code to transmit, from the first operator layer, the third feature value based on the input to an encoder layer that is subsequent to the encoder convolutional layer. The instructions loaded into the general-purpose process 102 may still further comprise code to generate an output of the ANN based on the third feature value based on the input.

In another aspect of the present disclosure, the instructions loaded into the general-purpose processor 102 may comprise code to process an input, such as a frame from a sequence of frames, of an ANN. The instructions loaded into the general-purpose processor 102 may also comprise code to receive, at a first operator layer of a set of operator layers, a first feature value based on the input from a first decoder convolutional layer of a decoder and a second feature value based on the input from a first encoder convolutional layer of a encoder. The instructions loaded into the general-purpose processor 102 may also comprise code to determine, at the first operator layer, a third feature value based on the input by performing a multiplication operation with the first feature value based on the input and the second feature value based on the input. The instructions loaded into the general-purpose processor 102 may further comprise code to transmit, from the first operator layer, the third feature value based on the input to a decoder layer that is subsequent to the first decoder convolutional layer. The instructions loaded into the general-purpose processor 102 may still further comprise code to generate an output of the ANN based on the third feature value based on the input.

Figure 2:
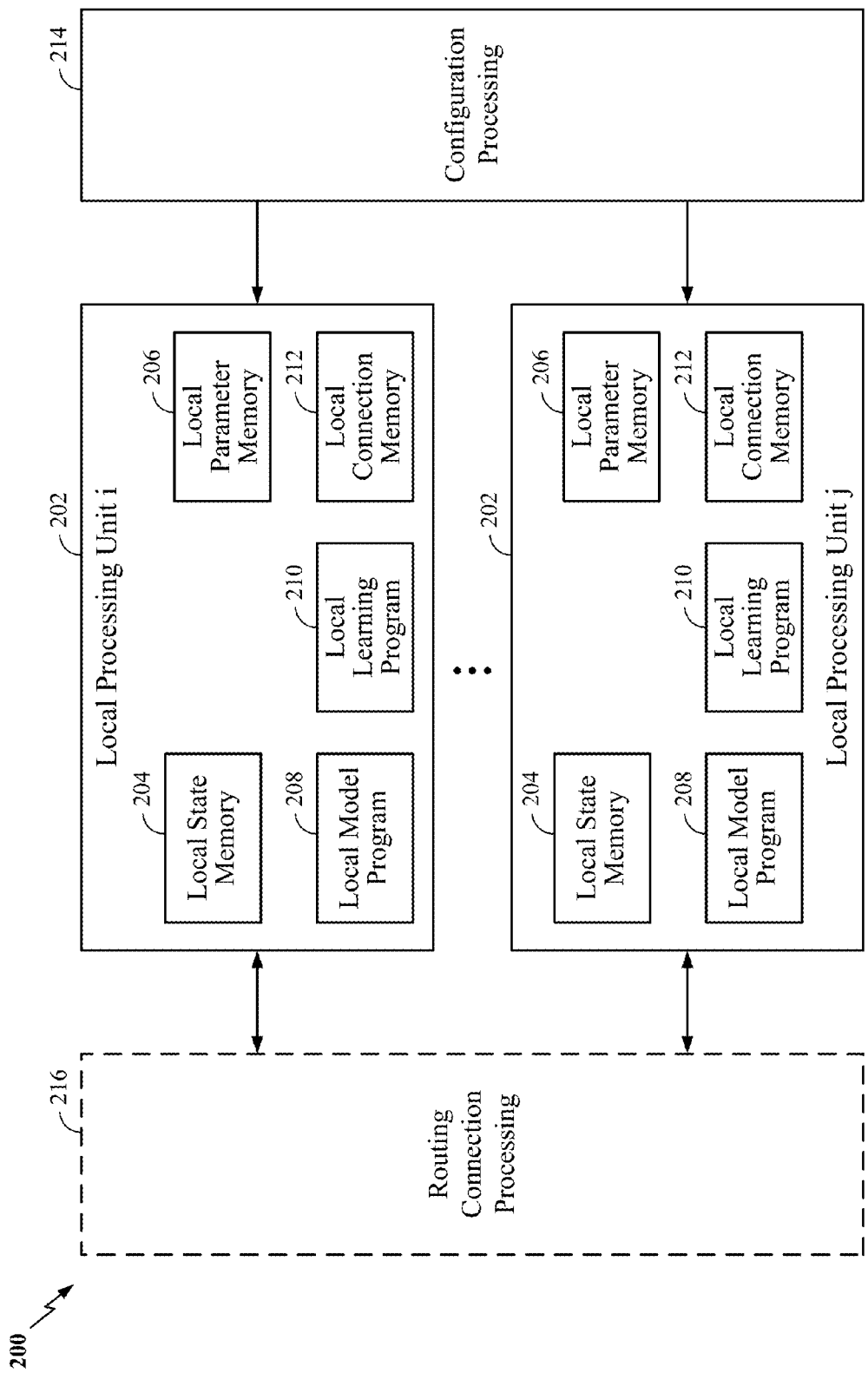
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

In one configuration, a processing model for processing an input of the ANN is configured to receive, at a first operator layer of a first set of operator layers, a first feature value based on the input from a first decoder convolutional layer of a first decoder and a second feature value based on the input from an encoder convolutional layer of a first encoder. The model is also configured to determine, at the first operator layer, a third feature value based on the input by performing an element-wise operation with the first feature value based on the input and the second feature value based on the input. The model is further configured to transmit, from the first operator layer, the third feature value to an encoder layer that is subsequent to the encoder convolutional layer. The model is also configured to generate an output of the ANN based on the third feature value based on the input.

In another configuration, a processing model for processing an input of an ANN is configured to receive, at a first operator layer of a set of operator layers, a first feature value based on the input from a first decoder convolutional layer of a decoder and a second feature value based on the input from a first encoder convolutional layer of a encoder. The model is also configured to determine, at the first operator layer, a third feature value based on the input by performing a multiplication operation with the first feature value based on the input and the second feature value based on the input. The model is further configured to transmit, from the first operator layer, the third feature value based on the input to a decoder layer that is subsequent to the first decoder convolutional layer. The model is also configured to generate an output of the ANN based on the third feature value based on the input.

The model includes a generating means, receiving means, determining means, and/or transmitting means. In one configuration, the generating means, receiving means, determining means, and/or transmitting means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high level concept may aid in discriminating the particular low level features of an input.

Figure 3A:
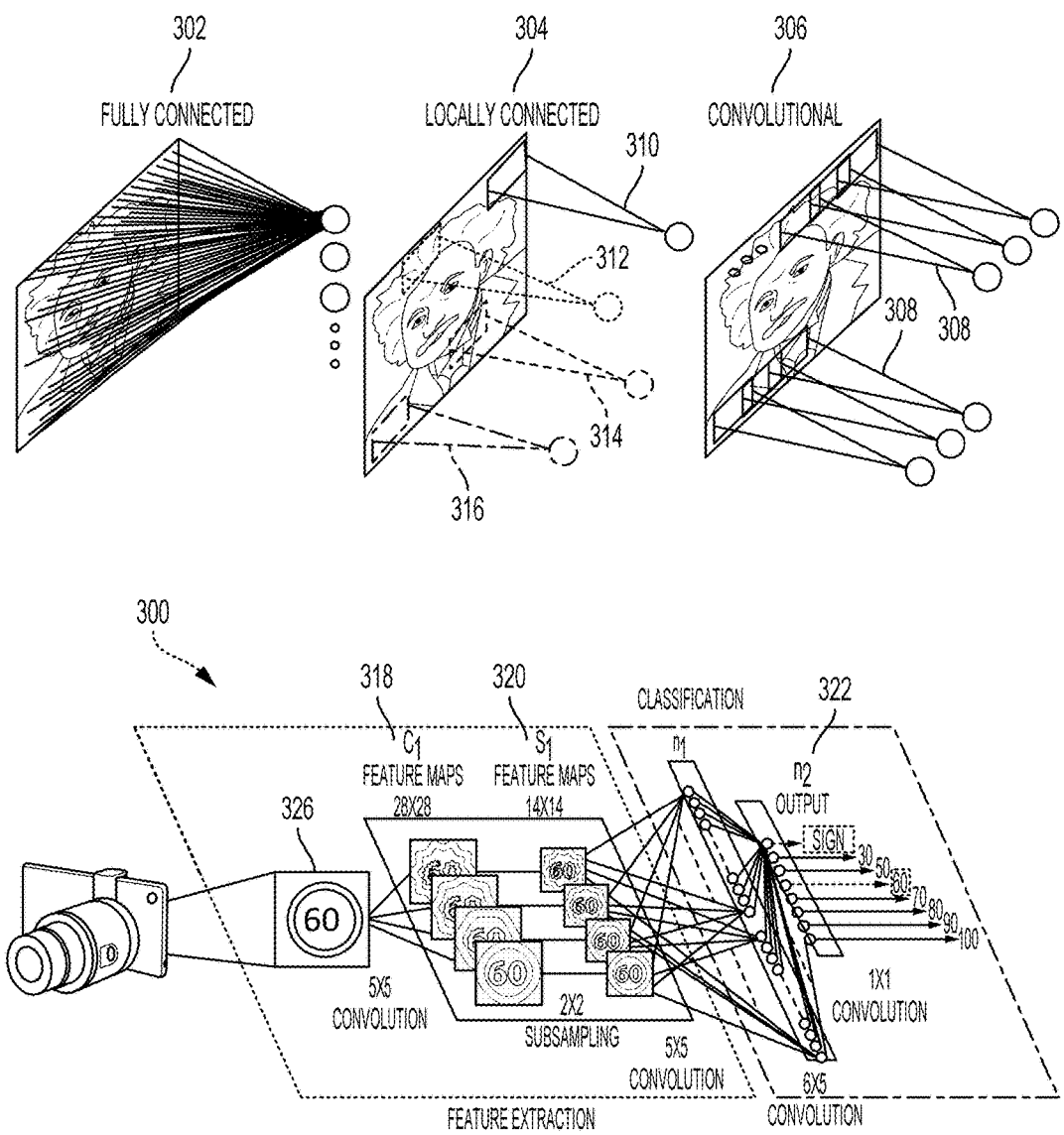
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A deep convolutional network (DCN) may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layers 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

Figure 3B:
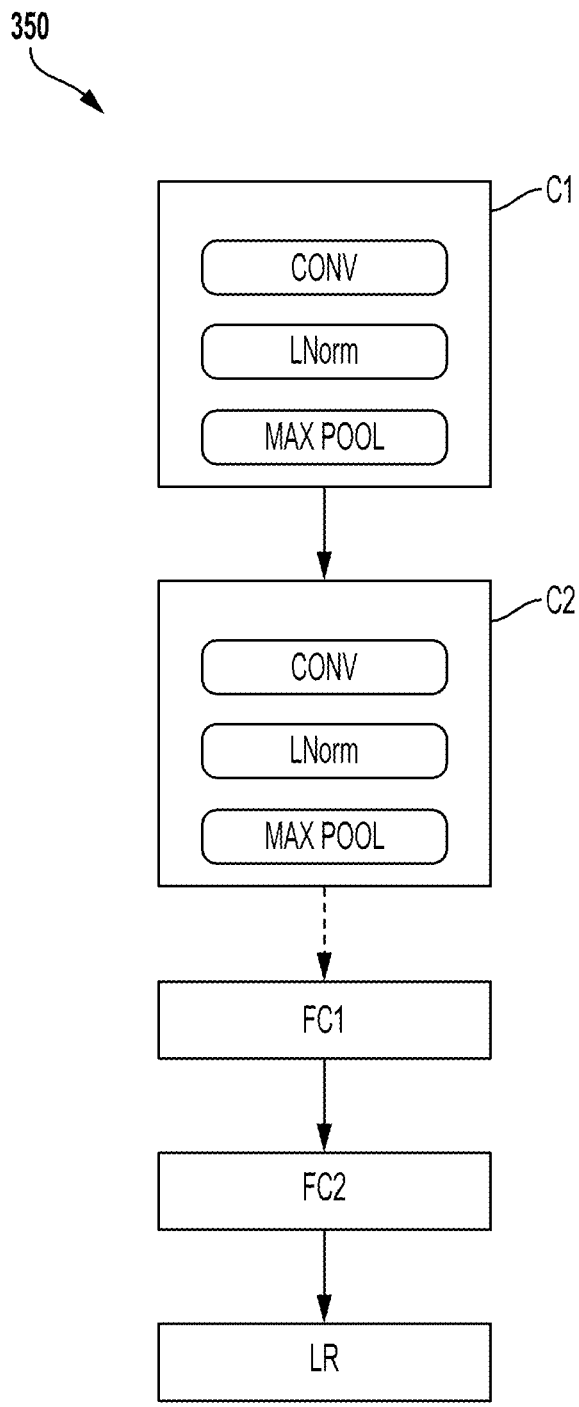
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolutional layer, a normalization layer (LNorm), and a pooling layer. The convolutional layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Neural Network for Image Processing

Figure 4A:
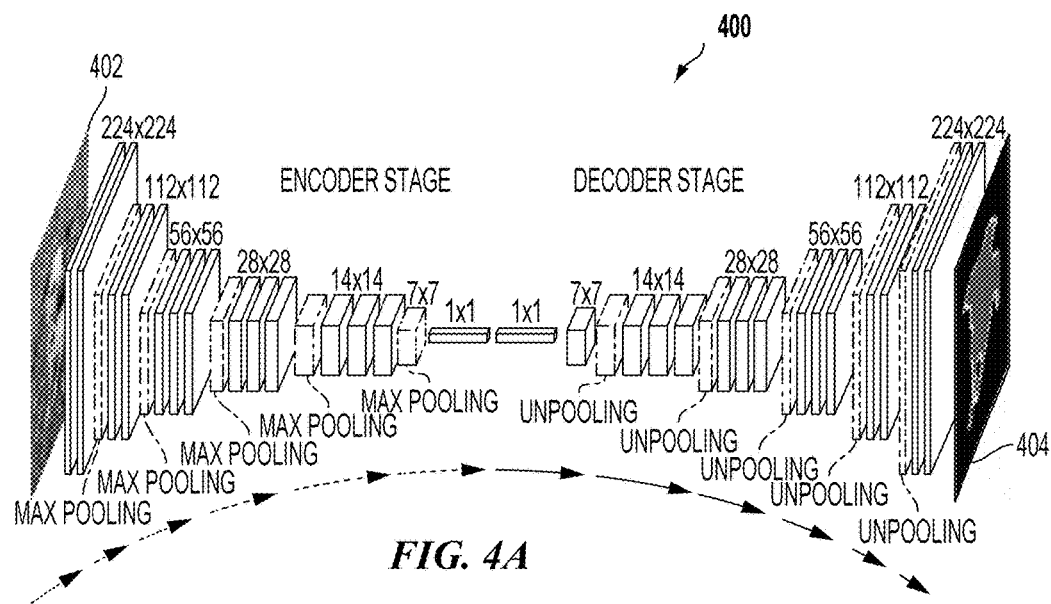
FIG. 4A illustrates an example of a convolutional encoder-decoder (CED) network according to aspects of the present disclosure.

FIG. 4A illustrates an example of a convolutional encoder-decoder (CED) network 400. As shown in FIG. 4A, an input image 402 having a size of 224×224 is received at an encoder of the network 400. The image is processed through the multiple layers of the encoder, such that at the end of the encoder, the resolution of the input image 402 is 7×7. A fully-connected layer, having a dimension of 1×1, transmits the output of the encoder (e.g., low dimensional feature representations) to the decoder. Furthermore, the decoder maps the low dimensional feature representations from the encoder to a full resolution image. As shown in FIG. 4A, the output of the decoder is an image 404 having a dimension of 224×224. In this example, the output image 404 is a semantic segmentation representation of the input image 402.

Figure 4B:
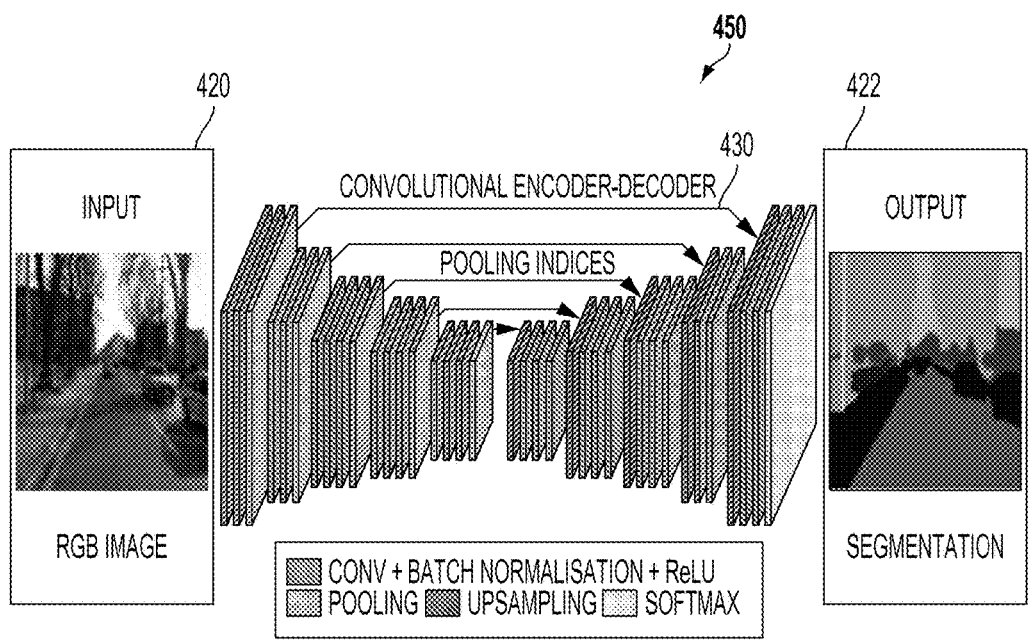
FIG. 4B illustrates an example of a feed-forward skip-connection convolutional encoder-decoder (fCED) network according to aspects of the present disclosure.

FIG. 4B illustrates another example of a convolutional encoder-decoder (CED) network 450. As shown in FIG. 4B, an input image 420 is received at an encoder of the network 450. In this example, the input image 420 is an image of a street and cars. The image is processed through the multiple layers of the encoder. A fully-connected layer (not shown) transmits the output of the encoder (e.g., low dimensional feature representations) to the decoder. Furthermore, the decoder maps the low dimensional feature representations from the encoder to a full resolution image. As shown in FIG. 4B, the output of the decoder is an image 422 that is a semantic segmentation representation of the input image 420. That is, the pixels of the input image 420 have been mapped to different labels, such that different labels are given different colors. In this example, the cars are represented as a first color, the road is a second color, the sidewalk is a third color, plants are a fourth color, and buildings are a fifth color. As previously discussed, the semantic segmentation generates a mask to determine different areas of an image.

Furthermore, as shown in FIG. 4B, different stages of the encoder are connected to different stages of the decoder via skip connections 430. The skip connections transmit an output from a stage of the encoder to a stage of the decoder to improve the decoding. The CED network 450 of FIG. 4B may be referred to as a feed-forward skip connection CED (fCED) network.

For conventional CED networks, to recover the full resolution image or image properties at the output of a decoder, the decoder includes an up-sampling layer. Conventional up-sampling methods use up-sampling based on an index (e.g., index-based up-sampling) received from a max-pooling layer. Max-pooling is a form of non-linear down-sampling. That is, the max-pooling layer partitions the input image into a set of non-overlapping regions (e.g., grid/boxes/rectangles). For each region, the max-pooling layer outputs the maximum value. Furthermore, an index is generated to associate the pixel values with pixel locations of an up-sampled image. In conventional systems, the max-pooling indices, from the max-pooling layer in the encoder, are stored in memory and fetched from memory for up-sampling in the decoder. The index-based approach may increase the memory use and decrease performance, such as run time performance.

Conventional CED networks may also use high level feature representations from the encoder to recover the image in the decoder. Still, a loss in information may result in fuzzy image representation at the output. The fuzzy image representation may be problematic for object boundaries and/or when objects are small. Conditional random fields (CRFs) may be used to mitigate the fuzzy image representation.

Figure 5A:
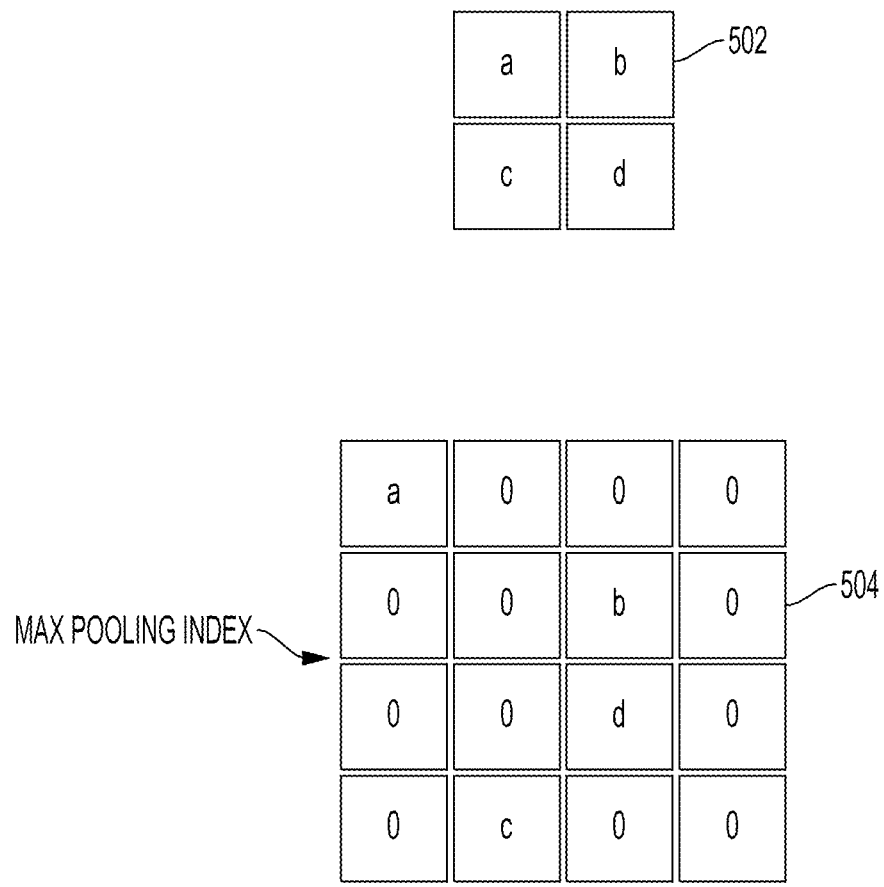
FIGS. 5A, 5B, and 5C illustrate examples of up-sampling an image according to aspects of the present disclosure.

FIG. 5A illustrates an example of up-sampling using an index received from the max-pooling layer. As shown in FIG. 5A, a down-sampled image 502 having a resolution of 2×2 may include the maximum pixel values a, b, c, and d obtained from a max-pooling layer. Furthermore, an index associates the pixel values in the down-sampled image 502 to pixel locations of an up-sampled image 504. During up-sampling, the pixel values will be placed in the appropriate locations based on the index received from the max-pooling layer. The remaining pixel locations may be filled by a pre-determined value, such as zero. In FIG. 5A, the index for a is 1, the index for b is 3, the index for c is 4 and the index for d is 1.

Figure 5B:
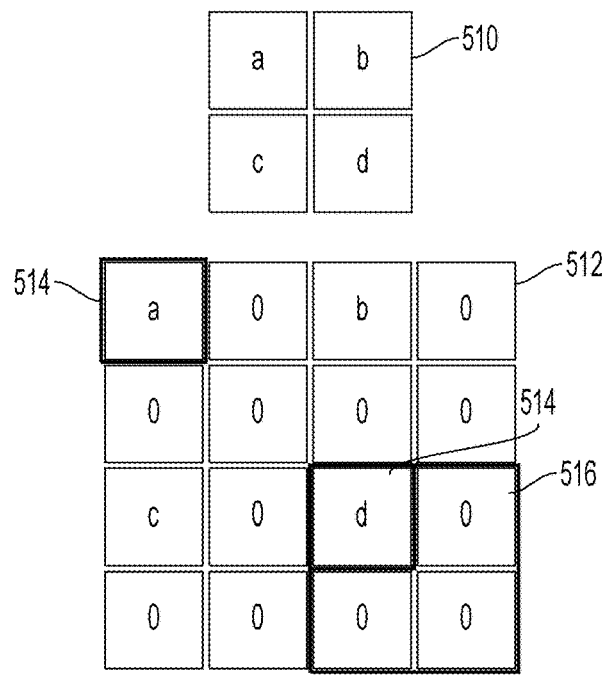

In one configuration, index-free up-sampling may be used to reduce the costs associated with index-based up-sampling. FIG. 5B illustrates an example of index-free up-sampling. In this example, the pixel values from the down-sampled image 510 are placed in predetermined locations of the up-sampled image 512. In this example, the predetermined locations are an upper left corner 514 of each 2×2 block 516 of the up-sampled image 512. Furthermore, as shown in FIG. 5B, the remaining pixel locations may be filled by a pre-determined value, such as zero. The up-sampling of FIG. 5B may be referred to as sparse up-sampling.

Figure 5C:
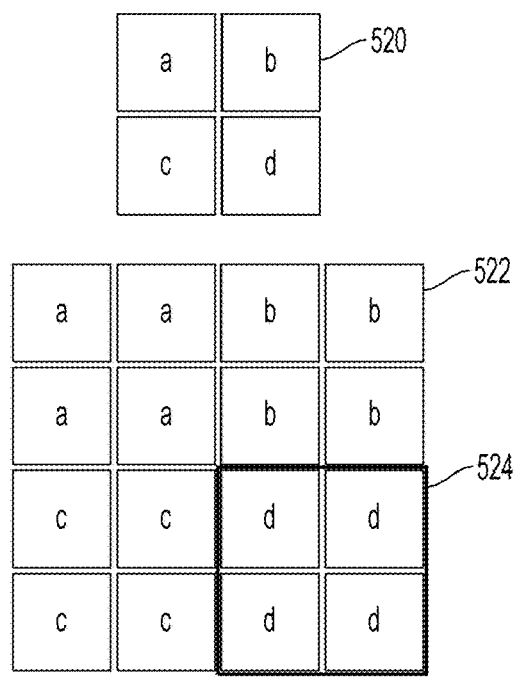

In another example, as shown in FIG. 5C, each pixel value from a down-sampled image 520 fills a specific area of the up-sampled image 522. In the example of FIG. 5C, each pixel value fills a 2×2 area 524 of the up-sampled image 522. The up-sampling of FIG. 5C may be referred to as dense up-sampling.

As previously discussed (e.g., with respect to FIG. 4A), an input image is processed by an encoder and the output of the encoder is processed by the decoder. Still, information may be lost during the encoding. Therefore, the output resolution of the decoder may not be the same as the input resolution of the encoder. To improve the decoding, information from one stage of the encoder may be transmitted to the decoder prior to moving to the next stage of the encoder. For example, as shown in FIG. 4B, skip connections may transmit information from a stage of the encoder to a stage of the decoder. The retained information may be used by the decoder to recover the information/resolution.

Aspects of the present disclosure are directed to a convolutional encoder-decoder network that reduces the costs associated with up-sampling and retaining fine grain resolution.

Figure 6:
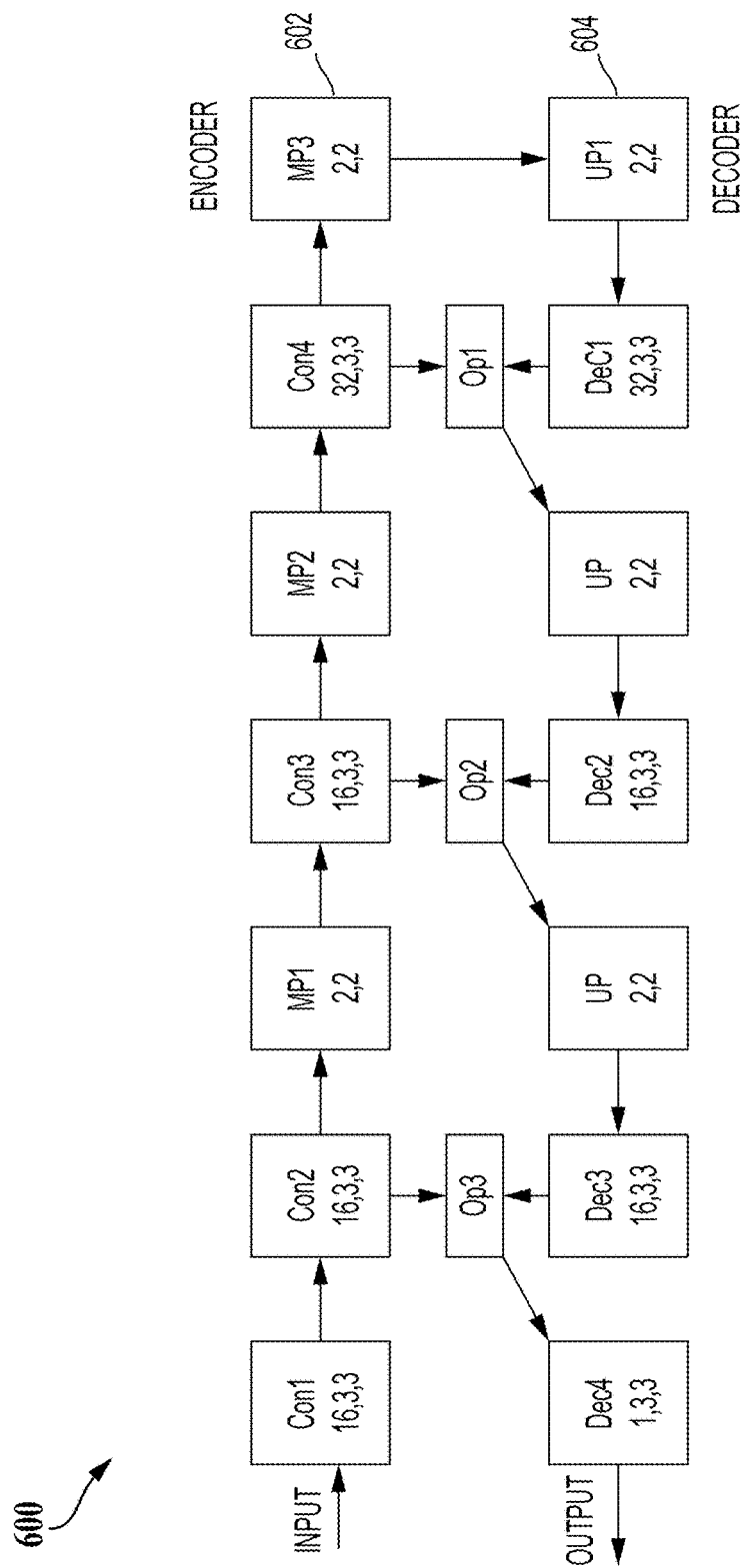
FIG. 6 illustrates an example of a feed-forward skip connection convolutional encoder-decoder (fCED) network according to aspects of the present disclosure.

FIG. 6 illustrates an example of a feed-forward skip-connection convolutional encoder-decoder (fCED) network 600. As shown in FIG. 6, an input, such as an image, is received at an input convolutional layer (Con1) of an encoder 602. The input convolutional layer may also be referred to as a first convolutional layer. The first convolutional layer has 16 channels (e.g., features) and a 3×3 filter, denoted as 16, 3, 3. Furthermore, the first convolutional layer outputs to a second convolutional layer (Con2). Additionally, the second convolutional layer outputs to a first max-pooling layer (Mp1). As previously discussed (e.g., with respect to FIGS. 5A-C), the maximum value of each region obtained from the max-pooling layer may be used for up-sampling.

Furthermore, as shown in FIG. 6, the output of a third max-pooling layer (MP3) is received at a decoder 604. For example, the output may be received at a first up-sampling layer. Although not shown in FIG. 6, the encoder 602 and decoder 604 are connected via a fully connected layer. The up-sampling may be sparse up-sampling, dense up-sampling, or another form of up-sampling. The up-sampled image may be output to a first convolutional layer (Dec1) of the decoder 604.

Additionally, as shown in FIG. 6, the output of a convolutional layer of the encoder (e.g., Con2, Con3, Con4) has a skip connection to an operator layer (Op) that is also connected to a convolutional layer of the decoder (e.g., Dec1, Dec2, Dec3). The skip connections may transmit information, such as feature values, from a stage of the encoder to a stage of the decoder. In conventional systems, the operator layer receives an output of the convolutional layer from the encoder and the output of the convolutional layer from the decoder to perform a sum operation, such as a limit-wise sum operation.

The output from encoder may a low dimensional feature representation of input data. In one configuration, the output of decoder is a probability map for a pixel level classification problem such as semantic segmentation. In another configuration, for image de-noising or super-resolution, the output of the decoder is a float or integer value (i.e., regression output).

In the network of FIG. 6, the convolutional layer may output a value for each pixel of the input and/or a region of the input. For example, for semantic segmentation, the convolutional layer may output a feature value for a classification of each pixel. As an example, the classification may be a binary classification to indicate whether the pixel represents a road (1) or a non-road (0) (e.g., car, tree, background).

Figure 7:
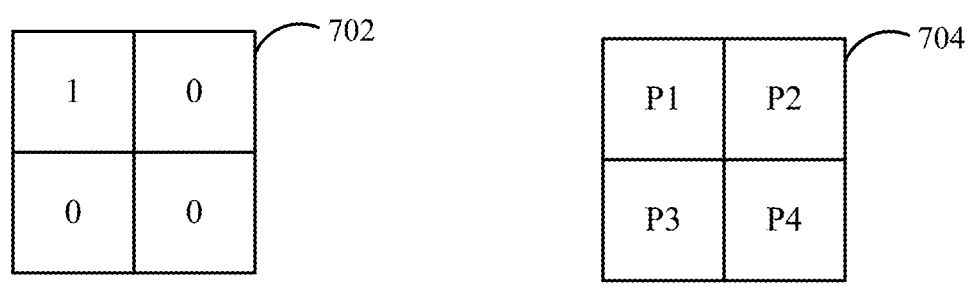
FIG. 7 illustrates an example of a pixel value map and a probability map according to aspects of the present disclosure.

For the road/non-road semantic-segmentation example below, the output from the decoder is a binary classifier, at the pixel level, with each pixel assigned a probability of being either a road pixel or no-road pixel. In one example, as shown in FIG. 7, an input image 702 may be a 2×2 image, the first pixel is a road pixel (1) and the other pixels are non-road pixels (0). For semantic segmentation, each convolutional stage of the encoder and decoder outputs a probability map 704 of the probability of a pixel being a road pixel and the probability of a pixel being a non-road pixel. For example, the decoder may determine that a first pixel (P1) has a 0.9 probability (e.g., 90%) of being a road pixel and a 0.1 probability of being a non-road pixel (e.g., feature value (0.9, 0.1)). Based on the determined probability, the network may predict that the first pixel is a road pixel.

Still, due to noise and/or other factors, the probability determinations may be fuzzy. For example, the network may determine that the first pixel has a 0.5 probability of being a road pixel and a 0.5 probability of being a non-road pixel. As another example, as a possible worst-case scenario, the network may determine that the first pixel has a 0.1 probability of being a road pixel and a 0.9 probability of being a non-road pixel.

Using the example of FIG. 6, during the encoding, the feature values from the second convolutional layer (Con2) are output to the third operator layer (Op3), the feature values from the third convolutional layer (Con3) are output to the second operator layer (Op2), and the feature values from the fourth convolutional layer (Con4) are output to the first operator layer (Op1). In conventional systems, a sum operation is performed on feature values output from a convolutional layer of the encoder and the feature values output from a convolutional layer of the decoder.

Using the example of FIG. 7, for a first pixel of the input image, the second convolutional layer (Con2) outputs a feature value of (1,0) (e.g., 1.0 probability of a road pixel and 0.0 probability of a non-road pixel). As a result of the second convolutional layer's (Con2) proximity to the input layer, the feature values of the second convolutional layer (Con2) are more accurate in comparison to the feature values of later layers, such as the fourth convolutional layer (Con4). That is, information may be lost between layers, resulting in less accurate feature values at later stages of the encoder.

Furthermore, the third convolutional layer of the decoder (Dec3) may output a feature value of (0.5, 0.5). The third operator (Op3) may perform a sum operation on the feature values such that the result is (1.5, 0.5). Based on the sum operation, during the decoding stage, the network predicts the first pixel is a road pixel, such that the first pixel will be given the probability value of one. Without the sum operation, the network may have difficulty assigning a probability value when the feature value is (0.5, 0.5). Furthermore, in some cases, the network may assign an incorrect probability value (e.g., zero or one). The probability value is output to the next stage for further processing. Based on the sum operation, the network predicts that the first pixel is a road pixel, such that the first pixel will be given a probability value of one. In this example, the low probability of the decoder is suppressed by recovering the feature value of the encoder.

Still, when a sum operation is performed, the output probability retains incorrect information of a non-road pixel. That is, in the previous example, the sum operation retains the 0.5 probability of a non-road pixel. To improve the decoding and the prediction of the probability values, it is desirable to remove incorrect information from the output of a convolutional layer of the decoder. As discussed above, the input stage of the encoder has more accurate information for the probability values in comparison to the later encoder stages. Thus, in one configuration, the operator layer connected to a convolutional layer subsequent to an input stage performs a product operation while the other operator layers perform a sum operation. That is, to improve suppression of false or corrupt values, the feature values of the convolutional layer of the encoder that is subsequent (e.g., immediately subsequent) to the input stage (e.g., Con2) are multiplied with the feature values of the penultimate convolutional layer of the decoder (e.g., Dec3). As shown in FIG. 6, the final convolutional layer of the decoder (Dec4) is an output layer.

Using the previous example, based on FIG. 7, for a first pixel of the input image, the second convolutional layer (Con2) outputs a feature value based on the input (1,0) computed at Con2 (e.g., 1.0 probability of a road pixel and 0.0 probability of a non-road pixel). Furthermore, the third convolutional layer of the decoder (Dec3) may output a feature value of (0.5,0.5). In this example, the third operator layer (Op3) multiplies the feature value (1,0) from the second convolutional layer (Con2) with the feature value (0.5,0.5) of the third convolutional layer of the decoder (Dec3), resulting in a feature value of (0.5,0). In this example, the feature values are based on the input. That is, as discussed above, the feature values may be determined for pixels of the input.

Based on the resulting feature value (0.5,0), the network determines that the first pixel is a road pixel, such that the first pixel will be given the probability value of one. The probability value is output to the next stage for further processing. Furthermore, in this example, the output no longer retains the corrupt value of 0.5 for the non-road pixel. That is, the contribution of an incorrect pixel probability is reduced (e.g., suppressed) in the later stages of the decoder. In another configuration, each operator layer may perform a product operation. Of course, aspects of the present disclosure are not limited to only the third operator layer (Op3) performing a product operation. Aspects of the present disclosure also contemplate other combinations of layers and/or other specific layers performing the product operation. Furthermore, aspects of the present disclosure are not limited to a product operation. Other operations, such as a sum operation or a maximum operation, are also contemplated.

In another configuration, an operator layer outputs to the next stage of the encoder. That is, the encoder performance may be improved by feeding-back information from the decoder. For example, the feature values of the decoder from time step zero are used by the encoder at time step zero. Thus, the network is a recurrent network.

Figure 8:
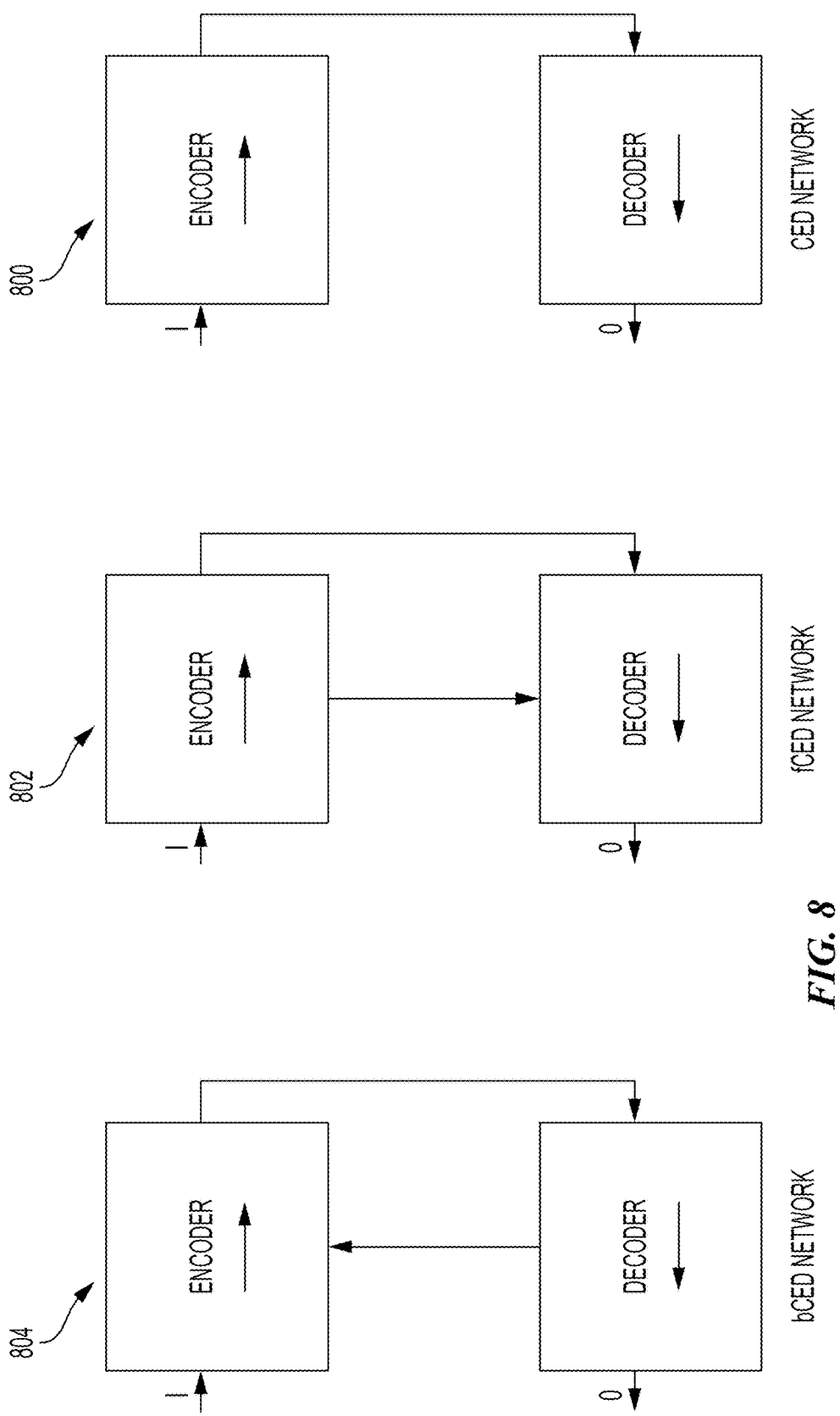
FIG. 8 illustrates examples of different neural networks according to aspects of the present disclosure.

In order for the decoder to feed back information to the encoder, the decoder should be initialized to a value. Thus, in one configuration, the decoder is initialized using a feed-forward skip connection CED network and the initialized decoder is used in a feedback skip connection CED network. The decoder may also be initialized using a CED network. To use the decoder to refine the encoder, one aspect of the present disclosure is directed to a pseudo-recurrent CED network FIG. 8, illustrates examples of different types of convolutional encoder-decoder (CED) networks. As shown in FIG. 8, in a CED network 800, the encoder receives an input (I) and the output of the encoder is received by the decoder to generate a network output (O). In one example, the network output is a probability-distribution map.

Furthermore, as shown in FIG. 8, in a feed-forward skip connection CED (fCED) network 802, the encoder receives an input (I) and the output of the encoder is received by the decoder to generate a network output (O). Additionally, in the fCED network 802, values, such as feature values based on the input, of the encoder are fed forward to the decoder to improve the decoding.

Finally, as shown in FIG. 8, in a feedback skip connection CED (bCED) network 804, the encoder receives an input (I) and the output of the encoder is received by the decoder to generate a network output (O). Furthermore, in the bCED network 804, values, such as feature values based on the input, of the decoder are fed back to the encoder to improve the encoding.

Figure 9:
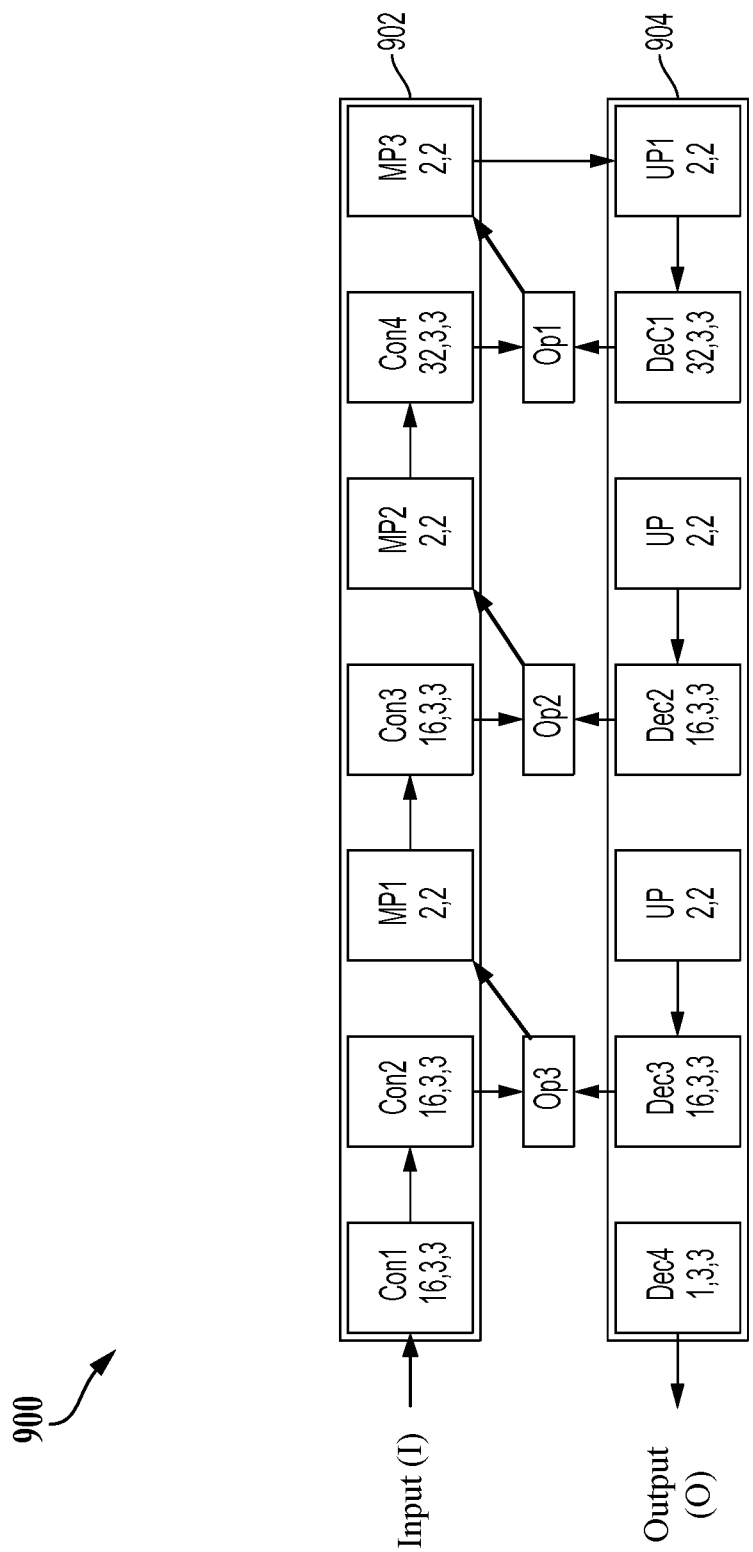
FIG. 9 illustrates an example of a feedback skip connection convolutional encoder-decoder (bCED) network according to aspects of the present disclosure.

FIG. 9 illustrates an example of a feedback skip connection CED (bCED) network 900. As shown in FIG. 9, an encoder 902 receives an input (I) and the output of the encoder is received by the decoder 904 to generate a network output (O). The output may be a de-noised image or semantic segmented image. Additionally, in the bCED network 900, values, such as feature values based on the input, of the decoder 904 are fed back to the encoder 902 via an operator layer (Op1-Op3) to improve the encoding. For the decoder 904 to feed back feature values to the encoder 902, the decoder 904 should be initialized prior to the initialization of the encoder 902. In one configuration, the decoder 904 is initialized independently of the encoder 902. The implementation of the bCED manifests to a recurrent architecture, such as a pseudo-recurrent CED.

Figure 10:
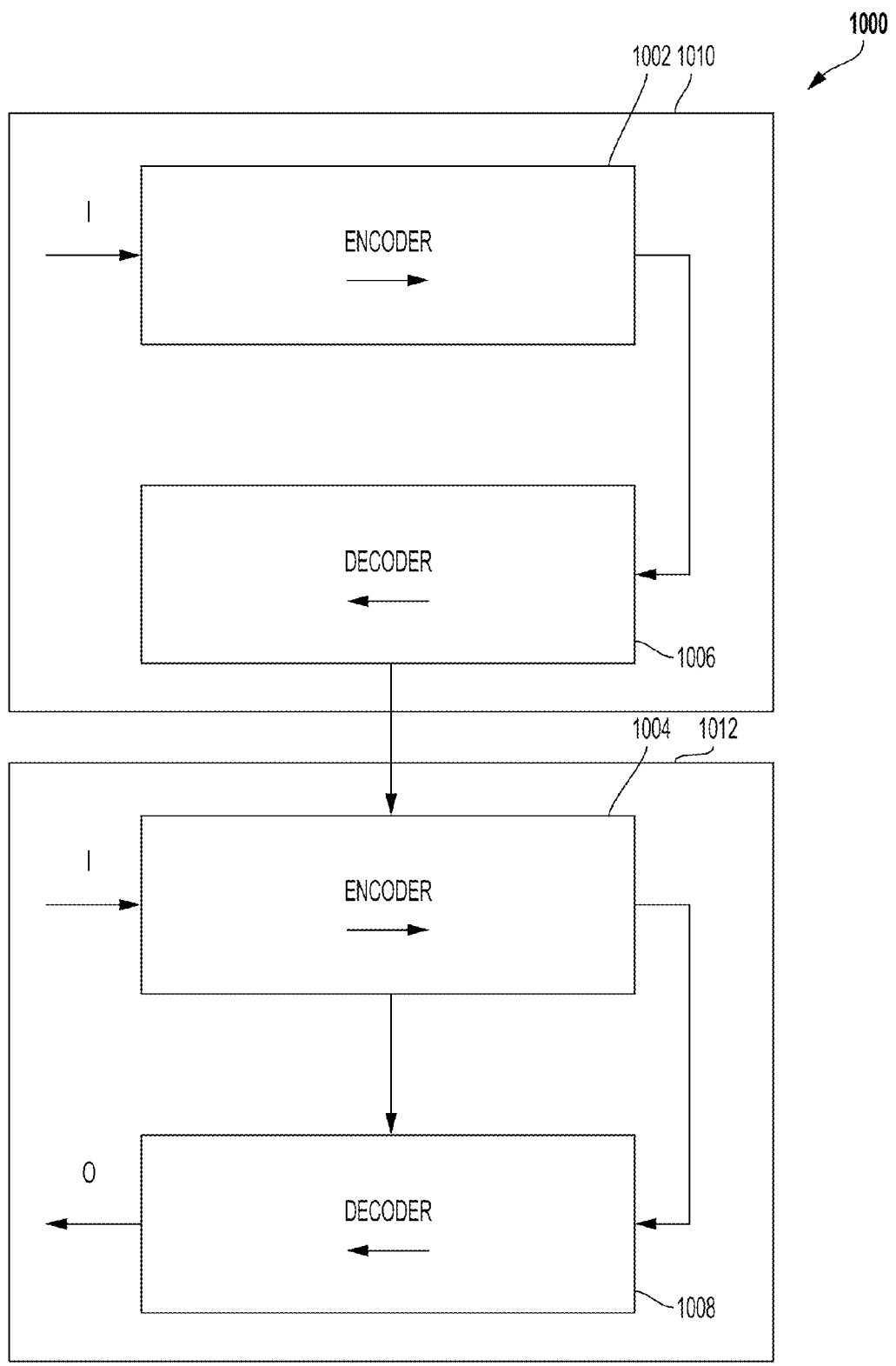
FIGS. 10, 11, and 12 illustrate examples of a hybrid convolutional encoder-decoder-feed-forward skip-connection convolutional encoder-decoder (CED-fCED) network according to aspects of the present disclosure.

FIG. 10 illustrates a pseudo-recurrent CED network 1000 according to an aspect of the present disclosure. The pseudo-recurrent CED network 1000 may be referred to as a hybrid CED 1010 and fCED 1012 network. As shown in FIG. 10, a first encoder 1002 and a second encoder 1004 receive a same input (I). The input may be received at time step 0. The output of the first encoder 1002 is received at a first decoder 1006. Furthermore, the information from the first decoder 1006 is fed to the second encoder 1004 to improve a second decoder 1008 when processing the input at time step 0. Additionally, at time step 0, the output of the second encoder 1004 is received by the second decoder 1008. Finally, as shown in FIG. 10, the information of the second encoder 1004 is fed forward to the second decoder 1008 to generate an output (O).

The CED portion 1010 of the pseudo-recurrent CED network 1000 may be used during training. That is, the CED portion 1010 may be initialized independently of the pseudo-recurrent CED network 1000. Furthermore, the CED portion 1010 may be removed during runtime. Additionally, in one configuration, the CED portion 1010 may also be implemented as an fCED.

Figure 11:
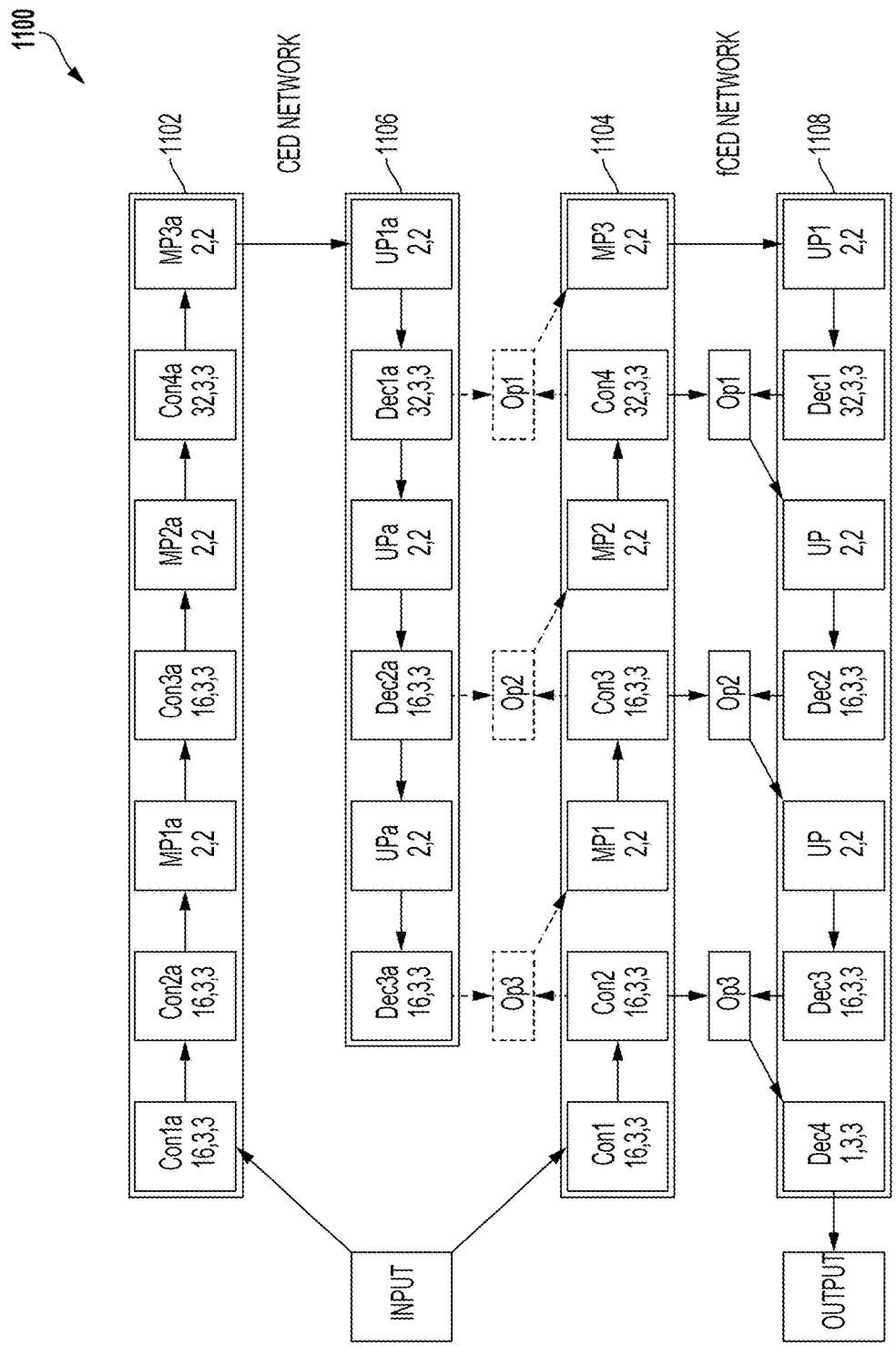

FIG. 11 illustrates an example of a pseudo-recurrent CED network 1100 according to an aspect of the present disclosure. As shown in FIG. 11, a CED encoder 1102 and fCED encoder 1104 receive a same input (I). The input is processed by the CED encoder 1102 and output to a CED decoder 1106.

As shown in FIG. 11, the CED decoder 1106 outputs information, such as a feature value based on the input, to a first set of operator layers (Op1-Op3) defined between the CED network and the fCED network. A bCED may comprise the CED decoder 1106 and the fCED encoder 1104. The first set of operator layers also receives information, such as a feature value based on the input, from the fCED encoder 1104. The first set of operator layers performs an operation, such as a sum operation, maximum operation or a product operation using the received information and transmit the result to a subsequent stage of the fCED encoder 1104, such as a max-pooling layer. The first set of operator layers are specified to improve the encoding performed by the fCED encoder 1104.

Furthermore, the convolutional layers of the fCED encoder 1104 also output information, such as a feature value based on the input, to a second set of operator layers (Op1-Op3) defined between the fCED encoder 1104 and a fCED decoder 1108. The second set of operator layers also receives information, such as a feature value based on the input, from the fCED decoder 1108. The second set of operator layers performs an operation, such as a sum operation, maximum operation, or a product operation using the received information, and transmits the result to a subsequent stage of the fCED decoder 1108, such as an up-sampling layer. The second set of operator layers is specified to improve the decoding performed by the fCED decoder 1108.

Figure 12:
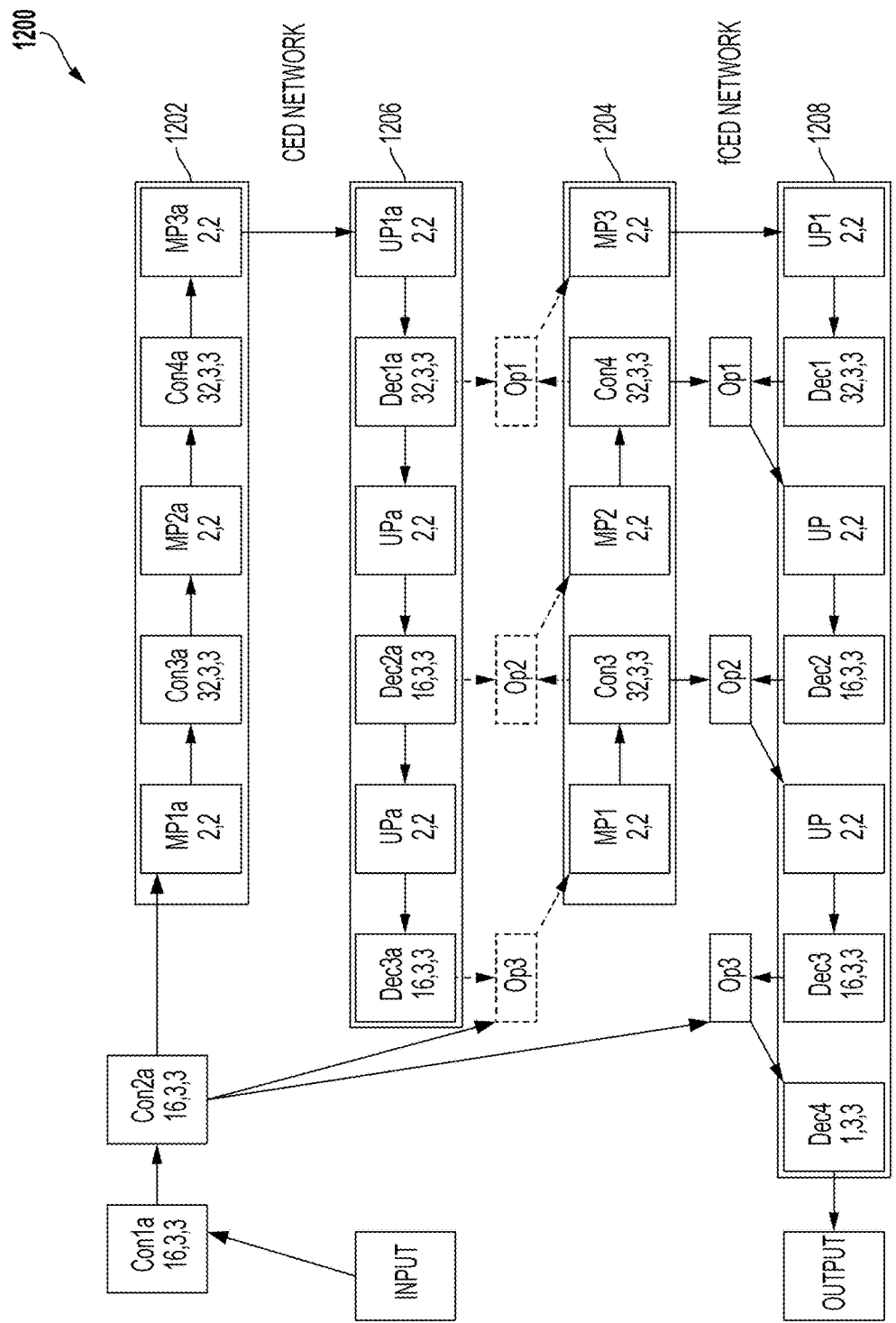

The CED encoder 1102 and fCED encoder 1104 may share common components. In one configuration, the common components may be unified to improve the performance of the network. FIG. 12 illustrates an example of a compact pseudo-recurrent CED network 1200 according to an aspect of the present disclosure.

As shown in FIG. 12, a first convolutional layer (Con1a) receives an input (I). The first convolutional layer (Con1a) outputs the processed input to a second convolutional layer (Con2a), which then outputs to a CED encoder 1202 and an fCED encoder 1204. That is, as shown in FIG. 12, a CED encoder 1202 and fCED encoder 1204 both receive an input from a same convolutional layer (e.g., Con2a). The first convolutional layer (Con1a) and the second convolutional layer (Con2a) are shared between the CED encoder 1202 and fCED encoder 1204 to improve performance of the network.

The output from the shared second convolutional layer (Con2a) is processed by the CED encoder 1202 and output to a CED decoder 1206. As shown in FIG. 12, the CED decoder 1206 outputs information, such as a feature value, to a first set of operator layers (Op1-Op3) defined between the CED network and the fCED network. A bCED may comprise the CED decoder 1206 and the fCED encoder 1204. The first set of operator layers also receive information, such as a feature value, from the fCED encoder 1204. The first set of operator layers performs an operation, such as a sum operation, maximum operation or a product operation using the received information and transmits the result to a subsequent stage of the fCED encoder 1204, such as a max-pooling layer. The first set of operator layers improve the encoding performed by the fCED encoder 1204.

The convolutional layers of the fCED encoder 1204 also output information, such as a feature value, to a second set of operator layers (Op1-Op3) between the fCED encoder 1204 and an fCED decoder 1208. The second set of operator layers receives information, such as a feature value, from the fCED decoder 1208. The second set of operator layers performs an operation, such as a sum operation, maximum operation, or a product operation using the received information, and transmits the result to a subsequent stage of the fCED decoder 1208, such as an up-sampling layer. The second set of operator layers improves the decoding performed by the fCED decoder 1208. In the example of FIG. 12, the features values are feature values based on the input.

Aspects of the present disclosure have been described as having an image as an input. Of course, aspects of the present disclosure are not limited to images and are also contemplated for other input types, such as audio and/or video.

Figure 13:
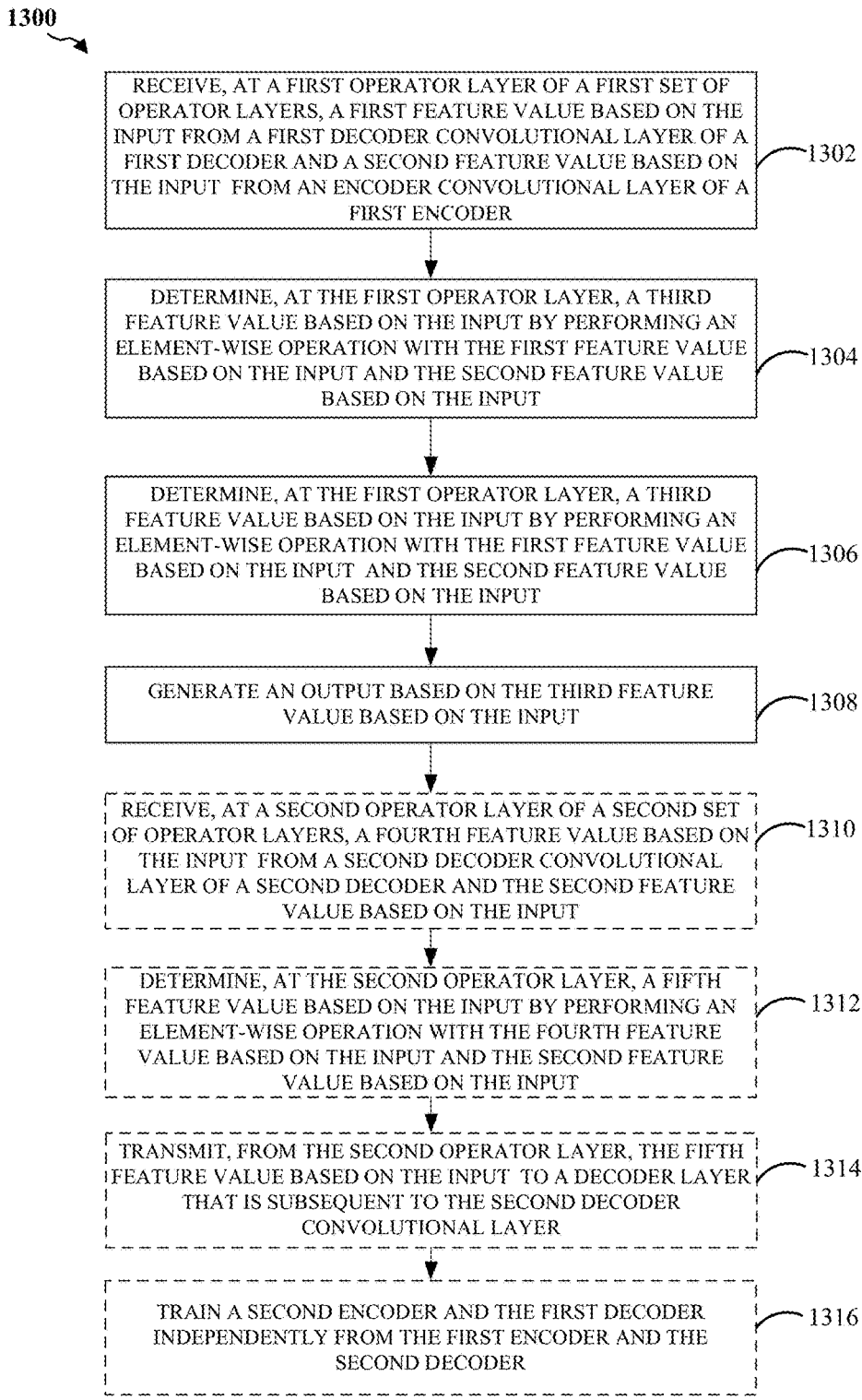
FIGS. 13 and 14 illustrate flow diagrams for processing an input according to aspects of the present disclosure.

FIG. 13 illustrates a method 1300 for processing an input of an artificial neural network (ANN). As shown in block 1302 the ANN receives, at a first operator layer of a first set of operator layers, a first feature value based on the input from a first decoder convolutional layer of a first decoder and a second feature value based on the input from an encoder convolutional layer of a first encoder. For example, a layer of the decoder, such as a convolutional layer, may determine that a first pixel based on the input has a 0.9 probability (e.g., 90%) of being a road pixel and a 0.1 probability of being a non-road pixel (e.g., feature value (0.9, 0.1)). Additionally, a layer of the encoder, such as a convolutional layer, may determine that the first pixel has a 0.7 probability of being a road pixel and a 0.3 probability of being a non-road pixel (e.g., feature value (0.7, 0.3)). The layer of the decoder and the layer of the encoder may transmit the determined feature values based on the input to an operator layer. As shown in FIG. 9, an operator layer (e.g., Op3) receives a feature value based on the input from a convolutional layer of the encoder 902 (e.g., Con2) and a convolutional layer of the decoder 904 (e.g., Dec3). In one configuration, the input is an image, such as a frame of a sequence of frames.

In block 1304, the ANN determines, at the first operator layer, a third feature value based on the input by performing an element-wise operation with the first feature value and the second feature value based on the input. The element-wise operation may be a multiplication operation, a sum operation, and/or a maximum operation. As an example, the first operator layer, may multiple the first feature value based on the input (0.9, 0.1) with the second feature value based on the input (0.7, 0.3) to obtain a third feature value based on the input (0.63, 0.3). As another example, the first operator layer, may add the first feature value based on the input (0.9, 0.1) with the second feature value based on the input (0.7, 0.3) to obtain a third feature value based on the input (1.6, 0.4). In yet another example, the first operator layer, may perform a max operation on the first feature value based on the input (0.9, 0.1) and the second feature value based on the input (0.7, 0.3) to obtain a third feature value based on the input (0.9, 0.3).

At block 1306, the ANN transmits, from the first operator layer, the third feature value based on the input to an encoder layer that is subsequent to the encoder convolutional layer. For example, as shown in FIG. 9, an operator layer (e.g., Op3), transmits the third feature value based on the input to a max-pooling layer (e.g., Mp1) of the encoder 902 that is subsequent to a convolutional layer (e.g., Con2). As another example, as shown in FIG. 11, an operator layer (Op3), transmits the third feature value based on the input to a max-pooling layer (Mp1) of the fCED encoder 1104 that is subsequent to a convolutional layer (e.g., Con2).

At block 1308, the ANN generates an output of the ANN based on the third feature value based on the input. That is, the third feature value based on the input may be further processed by subsequent layers of the ANN. For example, as shown in FIG. 9, an operator layer (e.g., Op3), transmits the third feature value based on the input to a max-pooling layer (e.g., Mp1) of the encoder 902. The other layers of the encoder 902 (e.g., Mp1-Mp3, Con3, Con4) process the third feature value based on the input and the encoder 902 after being processed by the max-pooling layer. The encoder 902 outputs a low dimensional feature representation of each pixel to the decoder 904. Additionally, the decoder 904 maps the low dimensional feature representation of each pixel, received from the encoder 902, to output a full resolution image. The full resolution image may be a semantic segmentation representation, a de-noised image, a de-blurred image, and/or a super-resolution image.

In an optional configuration, at block 1310, the ANN receives, at a second operator layer, a fourth feature value based on the input from a second decoder convolutional layer of a second decoder and the second feature value based on the input. For example, as shown in FIG. 11, an operator layer (e.g., Op3) receives a feature value based on the input from a convolutional layer (e.g., Con2) of the fCED encoder 1104 and also receives a feature value based on the input from a convolutional layer (e.g., Dec3) of the fCED decoder 1108.

In another optional configuration, at block 1312, the ANN determines, at the second operator layer, a fifth feature value based on the input by performing an element-wise operation with the fourth feature value based on the input and the second feature value based on the input. As discussed above, the element-wise operation may be a multiplication operation, a sum operation, and/or a maximum operation. In an optional configuration, at block 1314, the ANN transmits, from the second operator layer, the fifth feature value based on the input to a decoder layer that is subsequent to the second decoder convolutional layer. As an example, as shown in FIG. 11, an operator layer (e.g., Op3) transmits a feature value based on the input to a layer (e.g., Dec4) that is subsequent to the layer of the fCED decoder 1108 (e.g., Dec3) that transmitted the feature value based on the input to the operator layer (e.g., Op3). In this configuration, the output of the ANN may be based on the third feature value based on the input and the fifth feature value based on the input.

Figure 14:
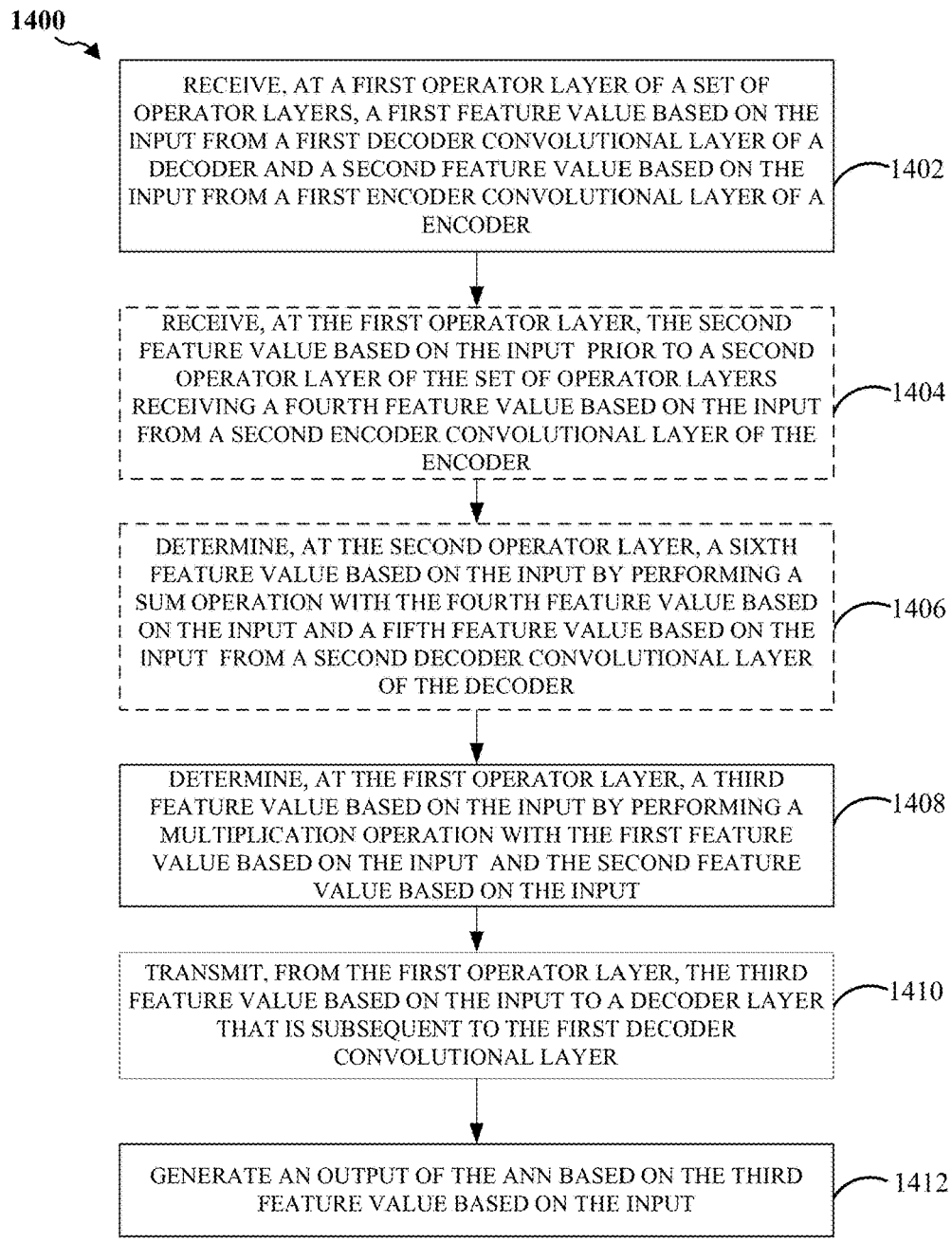

In an optional configuration, at block 1316, the ANN trains a second encoder and the first decoder independently from the first encoder and the second decoder. That is, the second encoder and the first encoder are initialized prior to an initialization of the first encoder and the second decoder. In one configuration, the second encoder and the first decoder are components of a convolutional encoder-decoder (CED) network. Furthermore, in this configuration, the first encoder and the second decoder are components of a feed-forward skip connection CED (fCED) network. That is, the CED portion may be used during training. In one configuration, the CED portion is initialized independently of the pseudo-recurrent CED network and/or the fCED network. Furthermore, the CED portion may be removed during runtime. Additionally, in one configuration, the CED portion may also be implemented as an fCED FIG. 14 illustrates a method 1400 for processing an input of an artificial neural network (ANN). At block 1402, the ANN receives, at a first operator layer of a set of operator layers, a first feature value based on the input from a first decoder convolutional layer of a decoder and a second feature value based on the input from a first encoder convolutional layer of a encoder. For example, a layer of the decoder, such as a convolutional layer, may determine that a first pixel based on the input has a 0.9 probability (e.g., 90%) of being a road pixel and a 0.1 probability of being a non-road pixel (e.g., feature value (0.9, 0.1)). Additionally, a layer of the encoder, such as a convolutional layer, may determine that the first pixel has a 0.7 probability of being a road pixel and a 0.3 probability of being a non-road pixel (e.g., feature value (0.7, 0.3)). The layer of the decoder and the layer of the encoder may transmit the determined feature values based on the input to an operator layer. As shown in FIG. 6, an operator layer (e.g., Op3) receives a feature value based on the input from a convolutional layer (e.g., Con2) of the encoder 602 and a convolutional layer (e.g., Dec3) of the decoder 604. In one configuration, the input is an image, such as a frame of a sequence of frames.

In an optional configuration, at block 1404, the ANN receives, at the first operator layer, the second feature value based on the input prior to a second operator layer receiving a fourth feature value based on the input from a second encoder convolutional layer of the encoder. As an example, as shown in FIG. 6, the third operator layer (Op3) receives a feature value based on the input, from a convolutional layer (e.g., Con2) of the encoder 602, prior to a second operator layer (Op2) receiving a feature value based on the input from another convolutional layer (e.g., Con3) of the encoder 602. In this example, the convolutional layer (Con2) is positioned before the convolutional layer (Con3).

In an optional configuration, at block 1406, the ANN determines, at the second operator layer, a sixth feature value based on the input by performing a sum operation with the fourth feature value based on the input and a fifth feature value based on the input from a second decoder convolution layer of the decoder. For example, as shown in FIG. 6, the second operator layer (Op2) may perform a sum operation on the feature values based on the input received from a convolutional layer (e.g., Con3) of the encoder 602 and a decoder convolutional layer (e.g., Dec2) of the decoder 604. As shown in FIG. 6, the second operator layer (Op2), which may perform the sum operation, is positioned after the third operator layer (Op3), which performs the multiplication operation.

At block 1408, the ANN determines, at the first operator layer, a third feature value based on the input by performing a multiplication operation with the first feature value based on the input and the second feature value based on the input. As an example, the first operator layer, may multiply the first feature value based on the input (0.9, 0.1) with the second feature value based on the input (0.7, 0.3) to obtain a third feature value based on the input (0.63, 0.3).

At block 1410, the ANN transmits, from the first operator layer, the third feature value based on the input to a decoder layer that is subsequent to the first decoder convolutional layer. For example, as shown in FIG. 6, an operator layer (e.g., Op3) transmits the third feature value based on the input to a convolutional layer (e.g., Dec4) of the decoder 604 that is subsequent to the convolutional layer (e.g., Dec3) that transmitted the feature value based on the input to the operator layer (e.g., Op3). In addition, at block 1412, the ANN generates an output of the ANN based on the third feature value based on the input. As an example, as shown in FIG. 6, the encoder 602 outputs a low dimensional feature representation of each pixel to the decoder 604. Additionally, the decoder 604 maps the low dimensional feature representation of each pixel, received from the encoder 602, to output a full resolution image. The output is generated based on the feature values based on the input received from the operator layers. The full resolution image may be a semantic segmentation representation, a de-noised image, a de-blurred image, and/or a super-resolution image.

In some aspects, the method 1300 and/or method 1400 may be performed by the SOC 100 (FIG. 1) or the system 200 (FIG. 2). That is, each of the elements of the methods 1300, 1400 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means (e.g., means for determining, means for generating, and means for transmitting) may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media (e.g., a non-transitory computer-readable medium), and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for processing an input in an artificial neural network (ANN), the method comprising:
   receiving, at a first operator layer of a first plurality of operator layers, a first feature value based on the input from a first decoder convolutional layer of a first decoder and a second feature value based on the input from an encoder convolutional layer of a first encoder;
   determining, at the first operator layer, a third feature value based on the input by performing an element-wise operation with the first feature value based on the input and the second feature value based on the input, in which the element-wise operation comprises a product operation;
   transmitting, from the first operator layer, the third feature value based on the input to an encoder layer that is subsequent to the encoder convolutional layer; and
   generating an output of the ANN based at least in part on the third feature value based on the input.

2. The method of claim 1, in which the input comprises an image and the output comprises at least one of a de-noised image, a de-blurred image, a semantic segmented image, a super-resolution image, or a combination thereof.

3. The method of claim 1, further comprising:
   receiving, at a second operator layer of a second plurality of operator layers, a fourth feature value based on the input from a second decoder convolutional layer of a second decoder and the second feature value based on the input;
   determining, at the second operator layer, a fifth feature value based on the input by performing an element-wise operation with the fourth feature value based on the input and the second feature value based on the input; and
   transmitting, from the second operator layer, the fifth feature value based on the input to a decoder layer that is subsequent to the second decoder convolutional layer.

4. The method of claim 3, further comprising:
   training a second encoder and the first decoder independently from the first encoder and the second decoder, such that the second encoder and the first encoder are initialized prior to an initialization of the first encoder and the second decoder.

5. The method of claim 3, in which:
   a second encoder and the first decoder are components of a convolutional encoder-decoder (CED) network; and
   the first encoder and the second decoder are components of a feed-forward skip connection CED (fCED) network.

6. A method for processing an input in an artificial neural network (ANN), the method comprising:
   receiving, at a first operator layer of a plurality of operator layers, a first feature value based on the input from a first decoder convolutional layer of a decoder and a second feature value based on the input from a first encoder convolutional layer of an encoder;
   determining, at the first operator layer, a third feature value based on the input by performing a multiplication operation with the first feature value based on the input and the second feature value based on the input;
   transmitting, from the first operator layer, the third feature value based on the input to a decoder layer that is subsequent to the first decoder convolutional layer; and
   generating an output of the ANN based at least in part on the third feature value based on the input.

7. The method of claim 6, further comprising receiving, at the first operator layer, the second feature value based on the input prior to a second operator layer of the plurality of operator layers receiving a fourth feature value based on the input from a second encoder convolutional layer of the encoder.

8. The method of claim 7, in which the second encoder convolutional layer is after the first encoder convolutional layer.

9. The method of claim 7, further comprising determining, at the second operator layer, a sixth feature value based on the input by performing a sum operation with the fourth feature value based on the input and a fifth feature value based on the input from a second decoder convolutional layer of the decoder.

10. The method of claim 9, in which the second decoder convolutional layer is before the first decoder convolutional layer.

11. An artificial neural network (ANN) for processing an input, the ANN comprising:
    a memory; and
    at least one processor coupled to the memory, the at least one processor configured:
    to receive, at a first operator layer of a first plurality of operator layers, a first feature value based on the input from a first decoder convolutional layer of a first decoder and a second feature value based on the input from an encoder convolutional layer of a first encoder;
    to determine, at the first operator layer, a third feature value based on the input by performing an element-wise operation with the first feature value based on the input and the second feature value based on the input;
    to transmit, from the first operator layer, the third feature value based on the input to an encoder layer that is subsequent to the encoder convolutional layer; and
    to generate an output of the ANN based at least in part on the third feature value based on the input, in which the element-wise operation comprises a product operation.

12. The ANN of claim 11, in which the input comprises an image and the output comprises at least one of a de-noised image, a de-blurred image, a semantic segmented image, a super-resolution image, or a combination thereof.

13. The ANN of claim 11, in which the at least one processor is further configured:
    to receive, at a second operator layer of a second plurality of operator layers, a fourth feature value based on the input from a second decoder convolutional layer of a second decoder and the second feature value based on the input;

to determine, at the second operator layer, a fifth feature value based on the input by performing an element-wise operation with the fourth feature value based on the input and the second feature value based on the input; and to transmit, from the second operator layer, the fifth feature value based on the input to a decoder layer that is subsequent to the second decoder convolutional layer.

14. The ANN of claim 13, in which the at least one processor is further configured:

to train a second encoder and the first decoder independently from the first encoder and the second decoder, such that the second encoder and the first encoder are initialized prior to an initialization of the first encoder and the second decoder.

15. The ANN of claim 13, in which:

a second encoder and the first decoder are components of a convolutional encoder-decoder (CED) network; and the first encoder and the second decoder are components of a feed-forward skip connection CED (fCED) network.

16. An artificial neural network (ANN) for processing an input, the ANN comprising:

a memory; and at least one processor coupled to the memory, the at least one processor configured:

to receive, at a first operator layer of a plurality of operator layers, a first feature value based on the input from a first decoder convolutional layer of a decoder and a second feature value based on the input from a first encoder convolutional layer of an encoder;

to determine, at the first operator layer, a third feature value based on the input by performing a multiplication operation with the first feature value based on the input and the second feature value based on the input;

to transmit, from the first operator layer, the third feature value based on the input to a decoder layer that is subsequent to the first decoder convolutional layer; and to generate an output of the ANN based at least in part on the third feature value based on the input.

17. The ANN of claim 16, in which the at least one processor is further configured to receive, at the first operator layer, the second feature value based on the input prior to a second operator layer of the plurality of operator layers receiving a fourth feature value based on the input from a second encoder convolutional layer of the encoder.

18. The ANN of claim 17, in which the second encoder convolutional layer is after the first encoder convolutional layer.

19. The ANN of claim 17, in which the at least one processor is further configured to determine, at the second operator layer, a sixth feature value based on the input by performing a sum operation with the fourth feature value based on the input and a fifth feature value based on the input from a second decoder convolutional layer of the decoder.

20. The ANN of claim 19, in which the second decoder convolutional layer is before the first decoder convolutional layer.

* * * * *